United States Patent
Jiang et al.

(10) Patent No.: US 11,288,431 B2
(45) Date of Patent: Mar. 29, 2022

(54) METHOD AND SYSTEM FOR ESTABLISHING METAL INTERCONNECTION LAYER CAPACITANCE PREDICTION MODEL

(71) Applicant: Joulwatt Technology (Hangzhou) Co., Ltd., Hangzhou (CN)

(72) Inventors: Shengfeng Jiang, Hangzhou (CN); Yang Lu, Hangzhou (CN)

(73) Assignee: Joulwatt Technology (Hangzhou) Co., Ltd., Hangzhou (CN)

(*) Notice: Subject to any disclaimer, the term of this patent is extended or adjusted under 35 U.S.C. 154(b) by 0 days.

(21) Appl. No.: 16/991,383

(22) Filed: Aug. 12, 2020

(65) Prior Publication Data
US 2021/0279394 A1    Sep. 9, 2021

(30) Foreign Application Priority Data
Mar. 6, 2020    (CN) .......................... 202010150104.6

(51) Int. Cl.
G06F 30/367    (2020.01)
G06F 119/06    (2020.01)
H01L 23/522    (2006.01)

(52) U.S. Cl.
CPC ........ *G06F 30/367* (2020.01); *G06F 2119/06* (2020.01); *H01L 23/5223* (2013.01)

(58) Field of Classification Search
CPC . H01L 23/5223; H01L 27/0805; H01L 28/40; G06F 30/367; G06F 2119/06
See application file for complete search history.

(56) References Cited

U.S. PATENT DOCUMENTS

2011/0195679 A1*  8/2011  Lee .................. G01R 31/31718
                                                        455/115.1
2013/0227512 A1*  8/2013  Hershenson ............ G06F 30/30
                                                        716/132

FOREIGN PATENT DOCUMENTS

| CN | 108233332 | 6/2018 |
| CN | 106208692 | 5/2020 |
| CN | 111312676 | 6/2020 |

OTHER PUBLICATIONS

Mentor Graphics Calibre xRC User's Manual Software Version 2009.1 (Year: 2009).*

(Continued)

*Primary Examiner* — Rehana Perveen
*Assistant Examiner* — Cuong V Luu
(74) *Attorney, Agent, or Firm* — Treasure IP Group, LLC (57) ABSTRACT

A method and a system for establishing a metal interconnection layer capacitance prediction model are disclosed. The method for establishing the metal interconnection layer capacitance prediction model includes: extracting capacitance data of metal interconnect layer capacitors of different sizes by using a post simulation tool and establishing a relationship formula between capacitance value and size of the metal interconnect layer capacitors; separately extracting relationship data between voltage and capacitance value of the metal interconnect layer capacitors and between temperature and capacitance value of the metal interconnect layer capacitors by using a process device simulation tool, and add the relationship data to the relationship formula; and establishing a simulation model in accordance with the relationship formula of capacitance value, size, voltage and temperature. The method has improved modeling speed and reduced circuit design cycle. The model thereof can be applied to the analysis of the small size capacitors with reliability.

9 Claims, 6 Drawing Sheets

(56) References Cited

OTHER PUBLICATIONS

Aoyama et al. A New Characterization of Sub-um Parallel Multi-level Interconnects and Experimental Verification IEEE Transactions on Semiconductor Manufacturing, vol. 9, No. 1, Feb. 1996 (Year: 1996).*

Shi et al. Evolution and Optimization of BEOL MOM Capacitors Across Advanced CMOS Nodes IEEE 2018 (Year: 2018).*

* cited by examiner

METHOD AND SYSTEM FOR ESTABLISHING METAL INTERCONNECTION LAYER CAPACITANCE PREDICTION MODEL

CROSS-REFERENCE TO RELATED APPLICATION

This application claims the benefit of Chinese Patent Application No. 202010150104.6, filed on Mar. 6, 2020, entitled as 'METHOD AND SYSTEM FOR ESTABLISHING METAL INTERCONNECTION LAYER CAPACITANCE PREDICTION MODEL', which is incorporated herein by reference in its entirety.

BACKGROUND OF THE DISCLOSURE

Field of the Disclosure

The disclosure relates to the technical field of semiconductor technology, and more particularly, to a method and a system for establishing a metal interconnection layer capacitance prediction model.

Description of the Related Art

Three kinds of common capacitors in integrated circuits are MOM (metal oxide metal) capacitors, MOS (metal oxide semiconductor) capacitors and MIM (metal insulator metal) capacitors. Among them, the capacitance value of a MOS capacitor fluctuates greatly with the change of voltage, resulting in more leakage and low withstand voltage; a MIM capacitor needs to add additional mask in the process of use, so the process cost is high. However, the production cost of a MOM capacitor is low, and by using ready-made metal interconnection, the MOM capacitor has the advantages of fast charging and discharging speed, high voltage withstand, low leakage, high capacitance density and stable capacitance value under different voltages. Therefore, the MOM capacitor is widely used in circuit design, so the modeling of the MOM capacitor becomes very important.

In the applications of the MOM capacitors with different withstand voltages, the metal spacing is usually widened, that is, different metal widths or different structures are selected to form the MOM capacitor structure. According to a conventional modeling method of the MOM capacitor, if the circuit design needs to use MOM capacitance models working at different voltages, we need to list different MOM capacitor structures, then draw the published diagrams and tape them. After waiting for two to three months, we need to test the wafer on-chip to obtain MOM data, and finally, the MOM capacitance models are extracted and established. The whole modeling process is time-consuming and resource consuming, which will slow down the iteration speed of circuit design.

In addition, the conventional PDK (process design kit) usually only provides the MOM capacitance model composed of metals with a smallest metal spacing of the process, which will limit the design of high voltage applications. At the same time, limited by the current test conditions, it is difficult to obtain accurate data for small MOM capacitors, and therefore, it is difficult to establish the model of small MOM capacitors.

SUMMARY OF THE DISCLOSURE

In view of the above problems, the purpose of the present disclosure is to provide a method and a system for establishing a metal interconnection layer capacitance prediction model. The method firstly uses a post simulation tool to extract capacitance data of metal interconnection layer capacitors of different sizes, establishes the relationship between capacitance value and size, and then uses a process device simulation tool to extract the relationships between temperature and capacitance value and between voltage and capacitance value. Thus, the established model can be suitable for testing capacitors of different sizes, and the circuit design cycle is shortened.

According to one aspect of the disclosure, there is provided a method for establishing a metal interconnection layer capacitance prediction model, comprising:

extracting capacitance data of metal interconnect layer capacitors of different sizes by using a post simulation tool and establishing a relationship formula between capacitance value and size of the metal interconnect layer capacitors;

separately extracting relationship data between voltage and capacitance value of the metal interconnect layer capacitors and between temperature and capacitance value of the metal interconnect layer capacitors by using a process device simulation tool, and add the relationship data to the relationship formula; and establishing a simulation model in accordance with the relationship formula of capacitance value, size, voltage and temperature.

Alternatively, the metal interconnect layer capacitors are MOM capacitors.

Alternatively, the step of extracting capacitance data of metal interconnection layer capacitors of different sizes by using a post simulation tool and establishing a relationship formula between capacitance value and size of the metal interconnect layer capacitors comprising:

constructing an arrangement of metal interconnect layer capacitors with a plurality of different sizes;

using the post simulation tool to generate a post simulation table representing the capacitance data, wherein the post simulation table comprises a plurality of different capacitance values corresponding to the plurality of different sizes; and fitting the plurality of different sizes to the plurality of different capacitance values to generate the relationship formula between capacitance value and size of the metal interconnect layer capacitors.

Alternatively, the post simulation tool is Calibre xRC which adopts the R+C+CC mode to extract parasitic parameters, wherein R is parasitic resistance, C is intrinsic parasitic capacitance, and CC is coupling capacitance.

Alternatively, the capacitance value and the size of the metal interconnection layer capacitors are positively proportional.

Alternatively, the relationship formula between capacitance value and size of the metal interconnection layer capacitors is $MOM\_cap=j*MOM\_area+i$, wherein $MOM\_cap$ represents capacitance value, $MOM\_area$ represents size, and j represents dimensionless coefficient of $MOM\_area$, i represents intercept of the formula.

Alternatively, the relationship formula of capacitance value, size, voltage and temperature is $MOM\_cap=(j*MOM\_area+i)*MOM\_temp*MOM\_V$, wherein $MOM\_temp$ is relationship data between the temperature and the capacitance value, $MOM\_V$ is relationship data between voltage and capacitance value.

Alternatively, the MOM capacitors comprise strip capacitors and interdigital capacitors.

Alternatively, the size of a strip capacitor is $MOM\_area=k*L*finger$, wherein k represents dimensionless coefficient of MOM_area, L represents the length of overlapping metal electrodes in the strip capacitor, and finger represents the number of overlapping metal electrodes in the strip capacitor.

Alternatively, the expression of the size of an interdigital capacitor is MOM_area=k*finger1*finger2, wherein k represents dimensionless coefficient of MOM_area, finger1 represents the number of a first-type interdigital plates overlapped in the interdigital capacitor, and finger2 represents the number of a second-type interdigital plates overlapped in the interdigital capacitor.

According to another aspect of the disclosure, there is provided a system for establishing a metal interconnection layer capacitance prediction model, comprising:

a relationship building module for extracting capacitance data of metal interconnect layer capacitors of different sizes by using a post simulation tool and establishing a relationship formula between capacitance value and size of the metal interconnect layer capacitors;

a parameter configuration module for separately extracting relationship data between voltage and capacitance value of the metal interconnect layer capacitors and between temperature and capacitance value of the metal interconnect layer capacitors by using a process device simulation tool, and add the relationship data to the relationship formula;

a model generation module for establishing a simulation model in accordance with the relationship formula of capacitance value, size, voltage and temperature.

Alternatively, the post simulation tool includes Calibre xRC which adopts the R+C+CC mode to extract parasitic parameters, wherein R is parasitic resistance, C is intrinsic parasitic capacitance, and CC is coupling capacitance.

Due to the characteristics that the temperature and voltage have little influence on the capacitance value and are independent of the sizes of the capacitors, the method and system for establishing a metal interconnection layer capacitance prediction model provided by the disclosure firstly establish the relationship formula between capacitance value and size, and then add the influence of temperature and voltage on the capacitance value to the formula. Therefore, the method and the model system can greatly shorten the modeling period and reduces the occupation of resources. Moreover, the capacitance value is positively proportional to the size and by using the post simulation tool, the relationship formula of capacitance values of the different size capacitors can be quickly established, then in combination with the simulation tool, the relationship formula of capacitance value, size, temperature and voltage is established, and the capacitance model with variable size is established. The model has a wide range of applications. Moreover, the model established by the post simulation tool can also be used for the accurate analysis of small-size capacitors, and the model has high reliability.

Preferably, the method can extract the capacitance models with different structures and sizes by using the post simulation tool, and quickly obtain the capacitance values corresponding to different sizes according to the post simulation table. Because the relationship between size and capacitance value is obvious, the capacitance model with variable size can be established for quickly analyzing the influence of size change on capacitance value. Moreover, the iteration time of modeling and circuit design is greatly shortened without waiting for the tape test process, so that the occupation of the resources is reduced, and compared with the test data after taping, the accuracy of the established capacitance model is within the acceptance range. That is, the model has high accuracy and good reliability.

Preferably, the metal interconnection capacitors are MOM capacitors. Therefore, the model has the advantages of MOM capacitors including high charge and discharge speed, high voltage withstand, low leakage and high capacitance density. Moreover, the model is not only suitable for two-layer metal strip MOM capacitors and interdigital MOM capacitors, but also suitable for single-layer and multi-layer metal MOM capacitors, which can make good use of the advantages of MOM capacitors.

BRIEF DESCRIPTION OF THE DRAWINGS

The above and other objects, features and advantages of the present disclosure will become more apparent from the description below with reference to the accompanying drawings.

DETAILED DESCRIPTION OF THE DISCLOSURE

Various embodiments of the present disclosure will be described in more detail below with reference to the accompanying drawings. In the various figures, the same elements are denoted by the same or similar reference numerals. For the sake of clarity, the various parts in the figures are not drawn to scale. In addition, some well-known parts may not be shown. For simplicity, the semiconductor structure obtained after several steps can be described in one diagram.

When one layer or region is referred to as being "above" or "on" another layer or region in the description of device structure, it can be directly over or on the other layer or region, or other layers or regions may be intervened therebetween. Moreover, if the device is turned over, the layer or region will be "under" or "below" the other layer or region. When one layer is directly on another layer or region, the context will use the description of "A directly on B" or "A on B and adjacent to B".

In the present application, the term "semiconductor structure" means generally the whole semiconductor structure formed at each step of the method for manufacturing the semiconductor device, including all of the layers and regions having been formed.

The disclosure will be further described in detail with reference to the attached drawings and embodiments.

Figure 1:
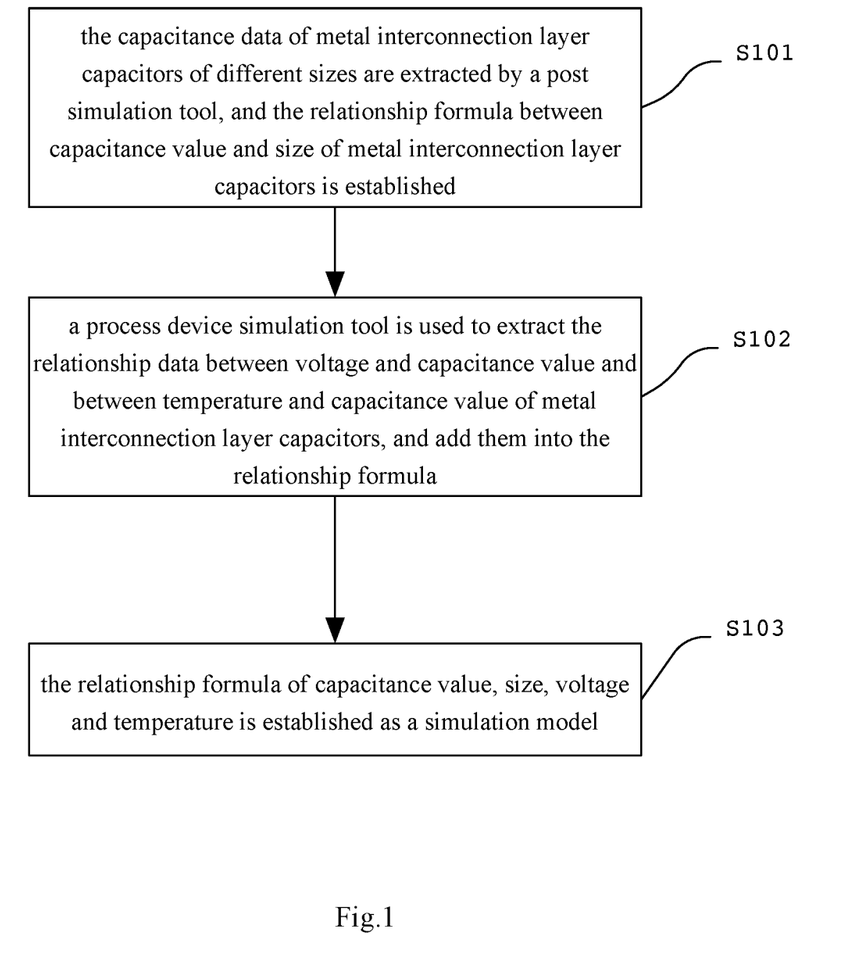
FIG. 1 shows a flow chart of a method for establishing a metal interconnection layer capacitance prediction model according to an embodiment of the present disclosure.

FIG. 1 shows a flow chart of a method for establishing a metal interconnection layer capacitance prediction model according to an embodiment of the present disclosure.

At present, the common method of establishing the model of metal interconnection layer capacitors is to draw the capacitors with different structures and sizes, tape them, test data and finally the model is established. This method takes a long time. In order to shorten the time, the software of TCAD (Technology Computer Aided Design), a semiconductor process simulation and device simulation tool, can be used to simulate the metal capacitance density, then the metal capacitance density is used to establish the capacitance model of the capacitors of different sizes. The simulation is usually two-dimensional simulation, and the simulation coverage of MOM capacitors is not complete and the simulation is difficult.

Therefore, this application adopts a new modeling method for establishing the model of metal interconnection layer capacitors. In this embodiment, the capacitance values of the capacitors with different structures and sizes are extracted by a post simulation tool, and the capacitance model is established, which improves the model accuracy and shortens the design time.

Specifically, the existing model of metal interconnect layer capacitors basically adopts sub-circuit structure, which is simple and flexible, and usually includes voltage coefficient, temperature coefficient and capacitance size coefficient. However, the capacitance density of the metal interconnection layer is determined by the distance of metal interconnection and the thickness of metal interlayer dielectric. The temperature and voltage have little influence on the distance of metal interconnection and the thickness of metal interlayer dielectric, so that, the temperature and voltage have little influence on the metal interconnection layer capacitance and are independent of the size of the capacitors. Therefore, the modeling method of this embodiment first focuses on the influence of the size of the capacitors on the metal interconnection layer capacitors.

As shown in FIG. 1, in step of S101, the capacitance data of metal interconnection layer capacitors of different sizes are extracted by a post simulation tool, and the relationship formula between capacitance value and size of metal interconnection layer capacitors is established.

Since the temperature and voltage have little influence on the capacitance value, the relationship between capacitance value and size is established first, and different capacitance values corresponding to different sizes of capacitors can be obtained quickly by using the post simulation tool, and parasitic capacitance and coupling capacitance can be considered.

Furthermore, extracting capacitance data of metal interconnect layer capacitors of different sizes by using the post simulation tool and establishing a relationship formula between capacitance value and size of the metal interconnect layer capacitors include:

In step of S1011, the layout of metal interconnect layer capacitors of a plurality of different sizes are constructed.

The layout or arrangement of metal interconnect layer capacitors of different sizes are made, and the sizes of different capacitors cover the application range of general circuits from small to large.

In step of S1012, the post simulation tool is used to generate a post simulation table representing the capacitance data, and the post simulation table includes a plurality of different capacitance values corresponding to a number of different sizes.

The capacitance values are calculated by the post simulation tool (for example, XRC or PEX), and the parasitic parameters are extracted in R+C+CC mode. The parasitic capacitance and coupling capacitance are considered, wherein R is the parasitic resistance, C is the intrinsic parasitic capacitance, and CC is the coupling capacitance.

The post simulation tool for example, is Calibre xRC, which can be used to obtain the post simulation table. The post simulation table lists the capacitance values corresponding to different sizes. The post simulation tool is often used in simulation presently, and will not be introduced in detail here.

In step of S1013, a plurality of different sizes are fitted to a number of different capacitance values to generate the relationship formula between capacitance value and size of metal interconnection layer capacitors.

The post simulation table lists the capacitance values corresponding to different sizes. According to the different sizes and the corresponding capacitance values of the capacitors with different structures, the relationship formula between size and capacitance value can be established.

Usually, when the structure of the metal interconnection layer capacitor change, for example, when some of its dimensions become larger, the capacitance value of the metal interconnection layer capacitor increases, that is, the capacitance value of the metal interconnection layer capacitor is positively proportional to its size, which means that the capacitance density of the metal interconnection layer capacitor is stable. This characteristic can be used to establish the relationship between capacitance value and size, and the data obtained after simulation in this embodiment can also prove this positively proportional relationship, which will be described in detail in the following FIG. 2 to FIG. 5.

In step S102, a process device simulation tool is used to extract the relationship data between voltage and capacitance value and between temperature and capacitance value of metal interconnection layer capacitors, and add them into the relationship formula.

The metal interconnection layer capacitor has size effect, that is, the capacitance value changes with the change of the size. At the same time, the metal interconnection layer capacitor also has voltage effect, that is, the capacitance value changes with the change of voltage. Similarly, temperature and capacitance value are also related. Although the influence of temperature and voltage on capacitance value is small, for the accuracy of the model, the influence of temperature and voltage on capacitance value is added in this step.

By using the process device simulation tool, the relationship data of voltage and capacitance value of the metal interconnection layer capacitor and the relationship data of temperature and capacitance value of the metal interconnection layer capacitor are extracted and added into the relationship formula obtained in Step S101. The process device simulation tool, for example, is Sentaurus module of the software of TCAD. Temperature and voltage are independent of size, so the Sentaurus module of TCAD can be used to establish the basic structure of the capacitor to simulate the relationship between voltage and temperature and complete the relationship formula. This is merely to give an implementable manner, and is not intended to limit the embodiments of the present disclosure.

In step of S103, the relationship formula of capacitance value, size, voltage and temperature is established as a simulation model.

The relationship formula of capacitance value including temperature coefficient, voltage coefficient and size factor is transformed into a model that can be simulated, that means, the model establishment is completed.

Furthermore, among the commonly used capacitors in integrated circuits, MOM (Metal-Oxide-Metal) capacitors are widely used in chip manufacturing. It mainly uses the capacitors between metals in the same layer, and can also stack multi-layer MOM capacitors to achieve a larger capacitance value. The advantage of this kind of capacitors is that it can be realized by the existing back-end metal interconnection technology, that is, it can implement the MOM capacitor and metal interconnection structure at the same time, without adding additional lithography layers, so it is widely used in high-level process. The metal interconnection layer capacitor of the embodiment can also be realized by the MOM capacitor.

When the metal interconnection layer capacitor is MOM capacitor, the capacitance value of the MOM capacitor is positively proportional to its size. According to the above step S101, the relationship formula between capacitance value and size of the MOM capacitor is as follows:

$$MOM\_cap = j*MOM\_area + i \quad (1)$$

Among them, MOM_cap is the capacitance value of the MOM capacitor, MOM_area is the size of the capacitor, j is dimensionless coefficient of MOM_area, i is the intercept of the formula of MOM_cap. MOM_area, for example, is the capacitance area, and it usually refers to the overlapping metal area.

Ideal relationship formula of MOM_cap is a zero crossing line. In practice, the capacitance will deviate from the ideal line due to the existence of parasitic capacitance and coupling capacitance when the size of MOM capacitor is small. Generally, the absolute value of intercept i is very small, which will be verified in FIG. 4 and FIG. 5.

The relationship formula of capacitance value, size, voltage and temperature established by the above step S103 is formula (2):

$$MOM\_cap = (j*MOM\_area + i)*MOM\_temp*MOM\_V \quad (2),$$

Among them, MOM_temp is the relationship data between temperature and capacitance value, MOM_V is the relationship data between voltage and capacitance value. Thus, the establishment of MOM capacitance model is completed. The modeling process takes a short time, the circuit design iteration time is less, and the resource occupation is also less. Furthermore, the simulation of different parameters such as temperature, voltage and size is added, so that the model has high accuracy.

In general, common MOM capacitors include strip capacitors and interdigital capacitors. Part of the structure of the MOM capacitor is described in connection with the FIG. 2 to FIG. 3

Figure 2:
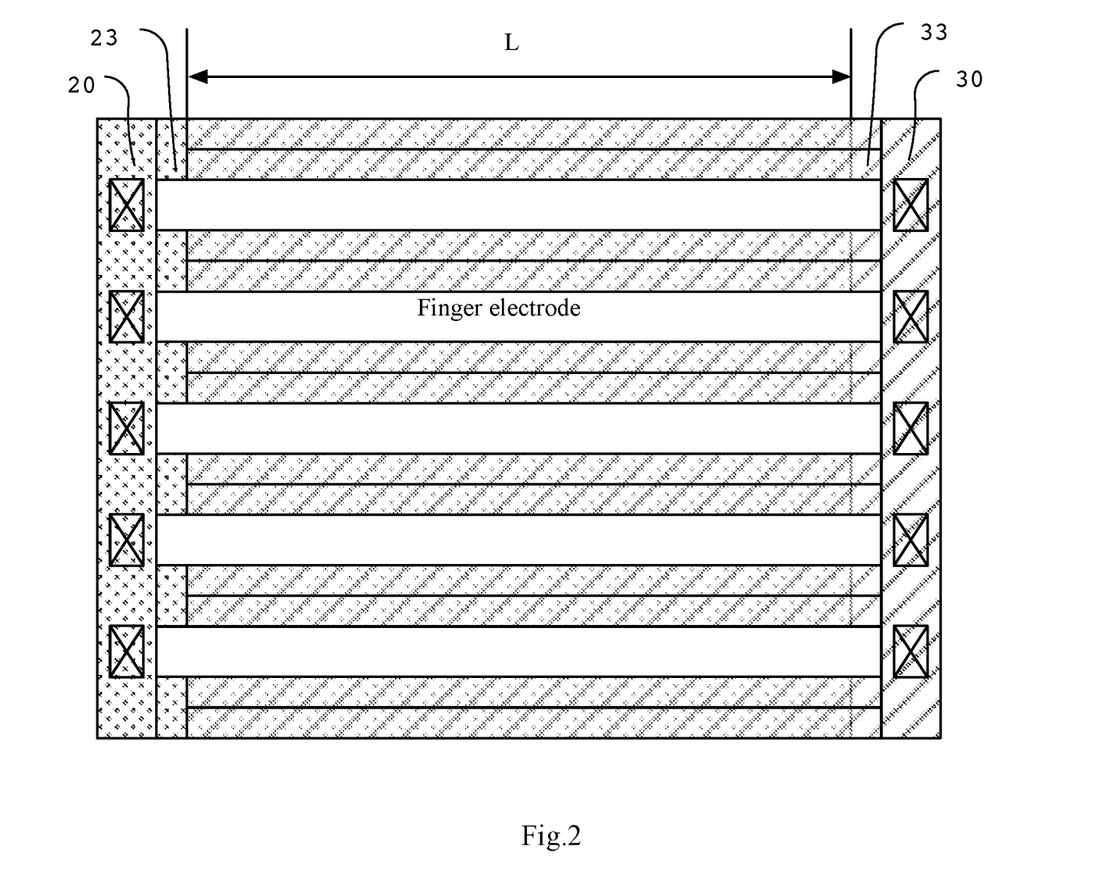
FIG. 2 shows a structural diagram of a strip MOM capacitor according to an embodiment of the disclosure.

FIG. 2 shows a structural diagram of a strip MOM capacitor according to an embodiment of the present disclosure.

As shown in FIG. 2, the MOM capacitor includes two overlapping layers of metal, the first layer of metal includes a first electrode 20 with finger structure, each first electrode 20 includes a plurality of parallel first finger plates 23, and one ends of the plurality of first finger plates 23 are connected together; the second layer metal includes a second electrode 30 with finger structure, and each second electrode 30 includes a plurality of parallel second finger plates 33, and one ends of a plurality of second finger plates 33 are connected together. The plurality of first finger plates 23 and the plurality of second finger plates 33 overlap with each other, the length of the overlapping part is L, and the number of overlapping plates is marked as finger. When the post simulation tool is used for simulation, the size obtained is the product of L and finger.

Figure 3:
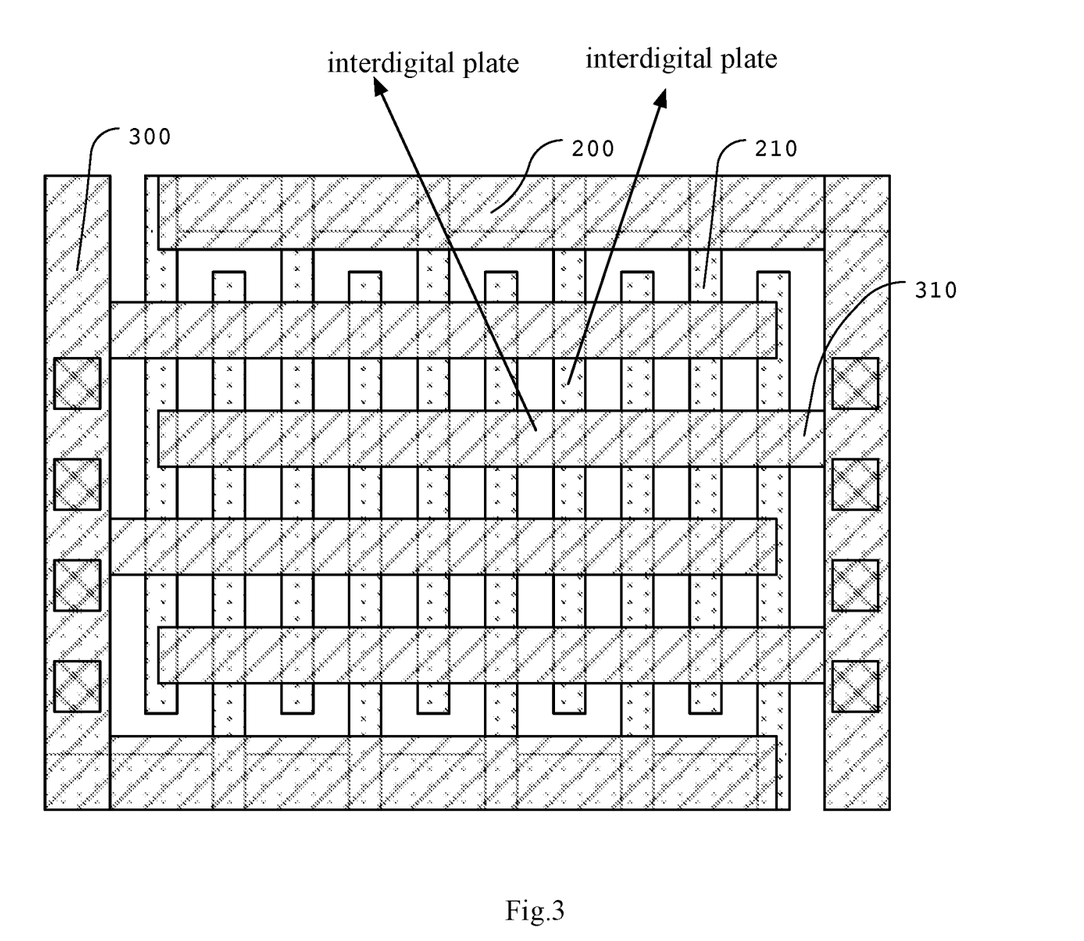
FIG. 3 shows a structural diagram of an interdigital MOM capacitor according to an embodiment of the present disclosure.

FIG. 3 shows a structural diagram of an interdigital MOM capacitor according to an embodiment of the present disclosure.

As shown in FIG. 3, the MOM capacitor includes two types of metal electrodes overlapped with each other, each first-type electrode 200 includes a plurality of parallel first-type interdigital plates 210, and one ends of the plurality of first-type interdigital plates 210 are connected together; each second-type electrode 300 includes a plurality of parallel second-type interdigital plates 310, and one ends of the plurality of second-type interdigital plates 310 are connected together. The plurality of first-type interdigital plates 210 and the plurality of second-type interdigital plates 310 overlap each other, the number of overlapping first-type interdigital plates 210 is denoted as Finger1, and the number of overlapping second-type interdigital plates 310 is marked as Finger2. When the post simulation tool is used for simulation, the size obtained is the product of Finger1 and Finger2.

FIG. 2 and FIG. 3 show two typical MOM structures, which are strip structure and interdigital structure. With the increase of L and finger of strip structure, or with the increase of Finger1 and Finger2 of interdigital structure, the size and capacitance value of MOM capacitor are also increased. When the size of MOM capacitor becomes larger, the relationship between MOM capacitance and size is positive proportional. FIG. 2 and FIG. 3 are only examples of a kind of MOM capacitors and are not used as a limitation of the capacitors of the disclosure.

In combination with FIGS. 4 and 5, simulation capacitance curves of the MOM capacitors in the embodiment of FIG. 2 and FIG. 3 are introduced below.

Figure 4:
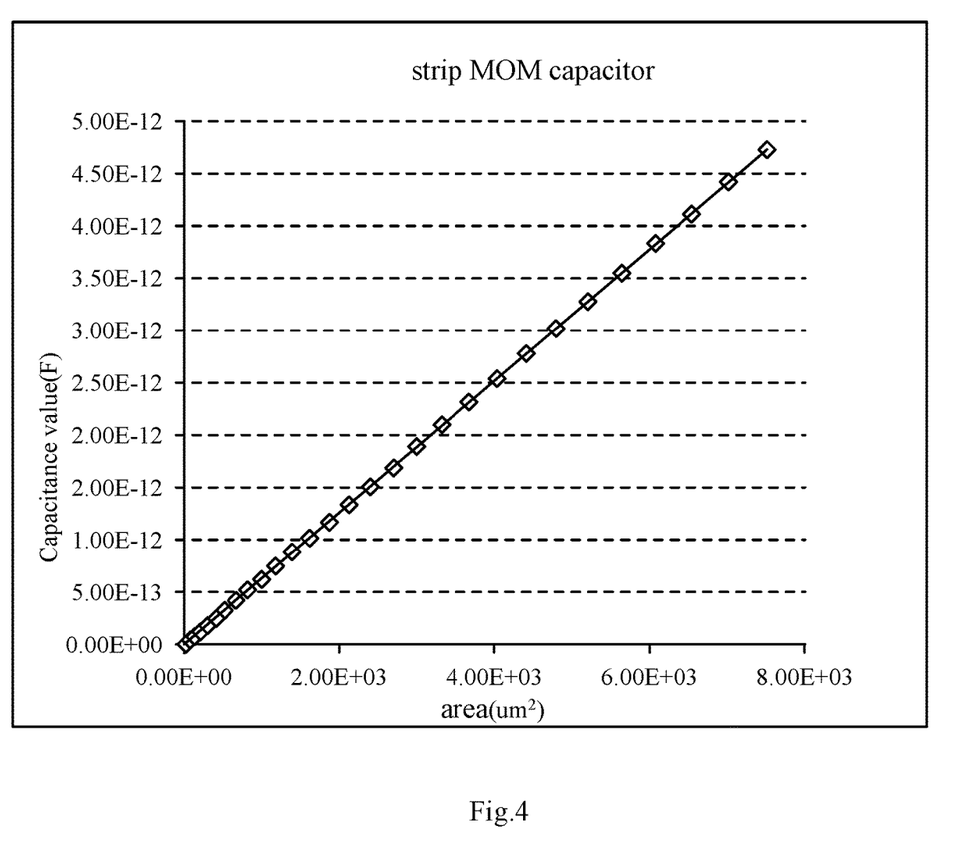
FIG. 4 shows a schematic diagram of the capacitance fitting curve of a strip MOM capacitor according to an embodiment of the present disclosure.

FIG. 4 shows a schematic diagram of the capacitance fitting curve of the strip MOM capacitor according to an embodiment of the present disclosure.

Combined with FIG. 2, the post simulation parameters of several strip capacitors with different structures and sizes are extracted, and the relationship between different size and capacitance value is obtained, which is summarized into the capacitance fitting curve. As shown in FIG. 4, the abscissa represents the size of the capacitor, that is, the area mentioned above, and the capacitance value is shown in the ordinate, and the relationship between them is expressed as a linear relationship. The expression of the size of the strip capacitor is formula (3):

$$MOM\_area = k*L*\text{finger} \quad (3),$$

where k is the dimensionless coefficient of MOM_area, L is the length of overlapping metal electrodes in the strip capacitor, and finger is the number of overlapped metal electrodes in the strip capacitor. According to the formula (1), the relationship of MOM_area and MOM_cap is represented in the coordinate diagram, which is the fitting curve shown in FIG. 4. It can be seen from the figure that the capacitance value is basically positively proportional to the size.

Figure 5:
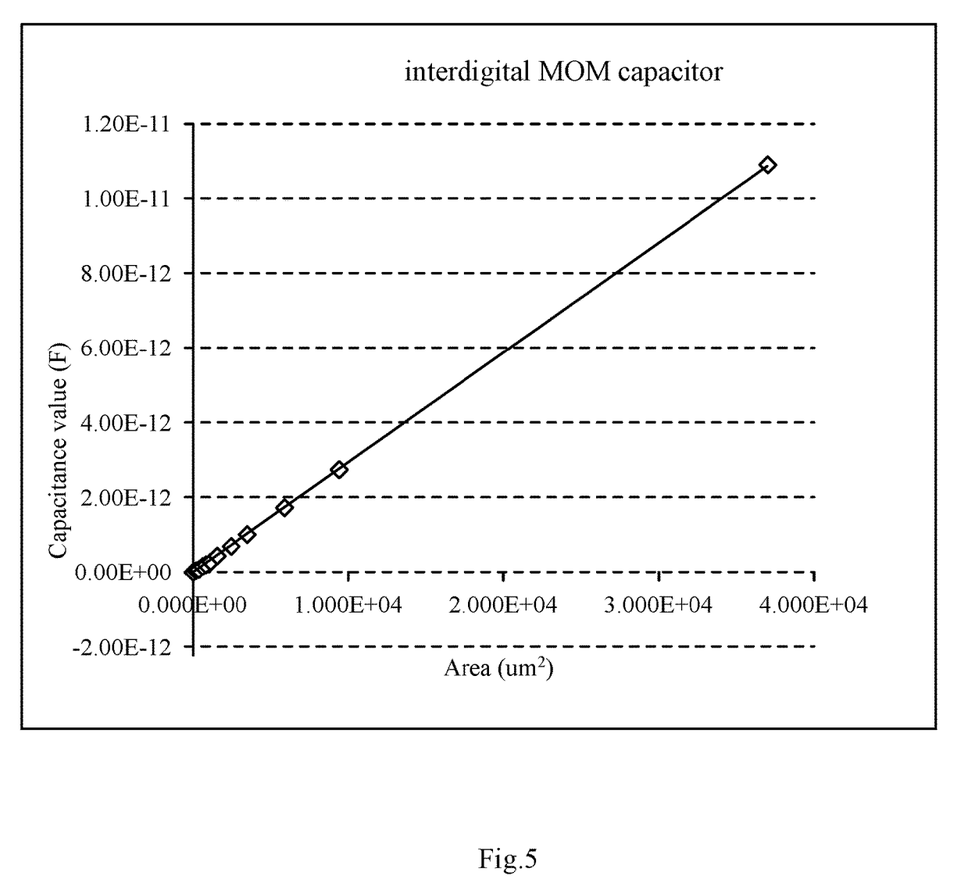
FIG. 5 shows a schematic diagram of capacitance fitting curve of an interdigital MOM capacitor according to an embodiment of the disclosure.

FIG. 5 shows a schematic diagram of capacitance fitting curve of an interdigital MOM capacitor according to an embodiment of the disclosure.

Combined with FIG. 3, the post simulation parameters of several interdigital capacitors with different structures and sizes are extracted, and the relationship between different size and capacitance value is obtained, which is summarized into the capacitance fitting curve. As shown in FIG. 5, the abscissa represents the size of the capacitor, that is, the area mentioned above, and the capacitance value is shown in the ordinate, and the relationship between them is expressed as a linear relationship. The expression of the size of the interdigital capacitor is formula (4)

$$MOM\_area = k*\text{Finger1}*\text{Finger2} \quad (4),$$

wherein k is the dimensionless coefficient of MOM_area, Finger1 is the number of the first-type metal electrodes overlapped in the interdigital capacitor, and Finger2 is the number of the second-type metal electrodes overlapped in the interdigital capacitor. According to formula (1), the relationship of MOM_Area and MOM_cap is represented in the coordinate diagram, that is the fitting curve shown in FIG. 5. It can be seen from the figure that the capacitance value is basically positively proportional to the size.

Therefore, the post simulation method of the embodiment of the disclosure can obtain the linear relationship between capacitance value and size of the capacitor, and the obtained relationship formula can verify the positively proportional relationship between capacitance value and size. The capacitance model established by this method can be applied to the analysis of capacitors of different sizes, so the model has wide application range and high reliability.

Figure 6:
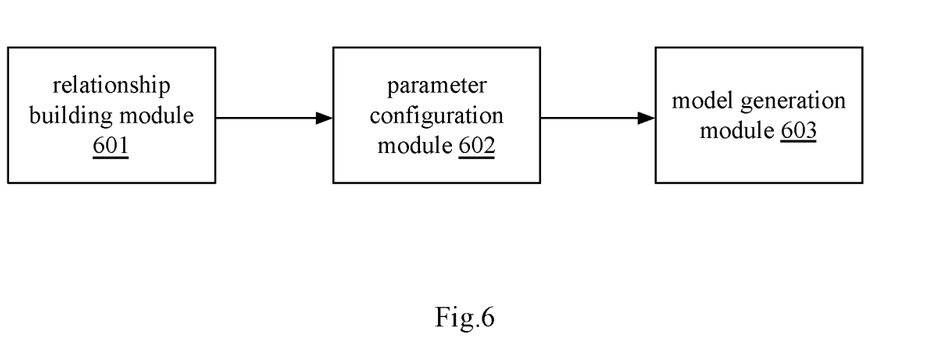
FIG. 6 shows a structural diagram of a system for establishing a metal interconnection layer capacitance prediction model according to an embodiment of the present disclosure.

FIG. 6 shows a structural diagram of a system for establishing a metal interconnection layer capacitance prediction model according to an embodiment of the present disclosure.

As shown in FIG. 6, the system for establishing the metal interconnection layer capacitance prediction model according to the embodiment includes: a relationship building module 601, a parameter configuration module 602 and a model generation module 603. Among them, the relationship building module 601 is used to extract capacitance data of metal interconnection layer capacitors of different sizes by a post simulation tool, and establish the relationship formula between capacitance value and size of metal interconnection layer capacitors; parameter configuration module 602 is used to separately extract relationship data of voltage and capacitance value of the metal interconnect layer capacitors and of temperature and capacitance value of the metal interconnect layer capacitors by using a simulation tool SPICE, and add the relationship data to the relationship formula; the model generation module 603 is used to establish the relationship formula of capacitance value, size, voltage and temperature as a simulation model.

Calibre xRC is used as the post simulation tool for modeling. When extracting parasitic parameters, R+C+CC mode is adopted, wherein R is parasitic resistance, C is intrinsic parasitic capacitance and CC is coupling capacitance.

It should be noted that in the present disclosure, two-layer metal strip MOM capacitors and interdigital MOM capacitors are taken as examples, but the modeling method is also applicable to single-layer and multi-layer metal MOM capacitors.

To sum up, by making use of the characteristics that temperature and voltage have little influence on capacitance value, and have independent relationship with size of capacitor, the method and system for establishing a metal interconnection layer capacitance prediction model provided by the disclosure firstly establish the relationship formula between capacitance value and size, and then add the influence of temperature and voltage on capacitance value into the formula, which greatly shortens the modeling cycle and reduces the occupation of resources. Moreover, the capacitance value is positively proportional to the size. After using the post simulation tool, the relationship formula of capacitance value of the different size capacitors is quickly established. Combined with the simulation tool, the relationship of capacitance value, size, temperature and voltage is listed, and therefore, the capacitance model with variable size is established. The model has a wide range of applications. Moreover, the model established by the post simulation tool can also be used for the accurate analysis of small-size capacitors, and the model has high reliability.

Preferably, the method can extract the capacitance models with different structures and sizes by using the post simulation tool, and quickly obtain the capacitance values corresponding to different sizes according to the post simulation table. Because the relationship between size and capacitance value is obvious, the capacitance model with variable size can be established for quickly analyzing the influence of size change on capacitance value. Moreover, the iteration time of modeling and circuit design is greatly shortened without waiting for the tape test process, so that the occupation of the resources is reduced, and compared with the test data after taping, the accuracy of the established capacitance model is within the acceptance range. That is, the model has high accuracy and good reliability.

Preferably, the metal interconnection capacitors are MOM capacitors. Therefore, the model has the advantages of MOM capacitors including high charge and discharge speed, high voltage withstand, low leakage and high capacitance density. Moreover, the model is not only suitable for two-layer metal strip MOM capacitors and interdigital MOM capacitors, but also suitable for single-layer and multi-layer metal MOM metal capacitors, which can make good use of the advantages of MOM capacitors.

In accordance with the embodiments of the present disclosure, as described above, these embodiments are not exhaustive of all the details and do not limit the invention to the specific embodiments described. Obviously, many modifications and variations are possible in light of the above description. The embodiments were chosen and described in order to best explain the principles of the disclosure and the practical application so that those skilled in the art may, without departing from the spirit and scope of the disclosure, utilize the disclosure and adapt it. The disclosure is only limited by the claims, their full scope and equivalents.

The invention claimed is:

1. A method for predicting capacitance value of metal interconnection layer capacitors in integrated circuits, comprising:

by executing a Calibre xRC software, extracting capacitance data of metal interconnection layer capacitors of different sizes and establishing a relationship formula between capacitance value and size of the metal interconnect layer capacitors;

by executing a TCAD software, separately extracting relationship data between voltage and capacitance value of the metal interconnect layer capacitors and between temperature and capacitance value of the metal interconnect layer capacitors, and add the relationship data to the relationship formula;

establishing a simulation model in accordance with the relationship formula of capacitance value, size, voltage and temperature; and acquiring capacitance value of the metal interconnection layer capacitors according to the simulation model, wherein the metal interconnect layer capacitors are MOM capacitors, capacitance value and size of the metal interconnection layer capacitors are positively proportional, the relationship formula between capacitance value and size of metal interconnection layer capacitors is MOM_cap=j*MOM_area+i, wherein MOM_cap represents capacitance value, MOM_area represents size, and j represents dimensionless coefficient of MOM_area, i represents intercept of the formula.

2. The method according to claim 1, wherein the step of extracting capacitance data of the metal interconnection layer capacitors of different sizes by using the Calibre xRC software and establishing a relationship formula between capacitance value and size of the metal interconnect layer capacitors comprising:

constructing an arrangement of metal interconnect layer capacitors with a plurality of different sizes;

using the Calibre xRC software to generate a post simulation table representing the capacitance data, wherein the post simulation table comprises a plurality of different capacitance values corresponding to the plurality of different sizes; and fitting the plurality of different sizes to the plurality of different capacitance values to generate the relationship formula between capacitance value and size of the metal interconnect layer capacitors.

3. The method according to claim 1, wherein the Calibre xRC software adopts the R+C+CC mode to extract parasitic parameters, wherein R is parasitic resistance, C is intrinsic parasitic capacitance, and CC is coupling capacitance.

4. The method according to claim 1 wherein the relationship formula of capacitance value, size, voltage and temperature is MOM_cap=(j*MOM_area+i)*MOM_temp*MOM_V, wherein MOM_temp is relationship data between the temperature and the capacitance value, MOM_V is relationship data between voltage and capacitance value.

5. The method according to claim 1, wherein the MOM capacitors comprise strip capacitors and interdigital capacitors.

6. The method according to claim 5, wherein the size of a strip capacitor is MOM_area=k*L*finger, wherein k represents dimensionless coefficient of MOM_area, L represents the length of overlapping metal electrodes in the strip capacitor, and finger represents the number of overlapping metal electrodes in the strip capacitor.

7. The method according to claim 5, wherein the expression of the size of an interdigital capacitor is MOM_area=k*finger1*finger2, wherein k represents dimensionless coefficient of MOM_area, finger1 represents the number of a first-type interdigital plates overlapped in the interdigital capacitor, and finger2 represents the number of a second-type interdigital plates overlapped in the interdigital capacitor.

8. A model system for predicting capacitance value of metal interconnection layer capacitors in integrated circuits, comprising a processor, the processor executes following program modules stored in a memory:

a relationship building module for extracting capacitance data of metal interconnect layer capacitors of different sizes by executing a Calibre xRC software and establishing a relationship formula between capacitance value and size of the metal interconnect layer capacitors;

a parameter configuration module for separately extracting relationship data between voltage and capacitance value of the metal interconnect layer capacitors and between temperature and capacitance value of the metal interconnect layer capacitors by executing a TCAD software, and add the relationship data to the relationship formula;

a model generation module for establishing a simulation model in accordance with the relationship formula of capacitance value, size, voltage and temperature, and acquiring the capacitance value of the metal interconnection layer capacitors according to the simulation model, wherein the metal interconnect layer capacitors are MOM capacitors, capacitance value and size of the metal interconnection layer capacitors are positively proportional, the relationship formula between capacitance value and size of metal interconnection layer capacitors is MOM_cap=j*MOM_area+i, wherein MOM_cap represents capacitance value, MOM_area represents size, and j represents dimensionless coefficient of MOM_area, i represents intercept of the formula.

9. The system according to claim 8, wherein the Calibre xRC software adopts the R+C+CC mode to extract parasitic parameters, wherein R is parasitic resistance, C is intrinsic parasitic capacitance, and CC is coupling capacitance.

* * * * *